(12) United States Patent
Hilgers (10) Patent No.: US 7,750,419 B2
(45) Date of Patent: Jul. 6, 2010

(54) TUNEABLE ELECTRONIC DEVICES AND ELECTRONIC ARRANGEMENTS COMPRISING SUCH TUNEABLE DEVICES

(75) Inventor: Achim Hilgers, Alsdorf (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 12/158,652

(22) PCT Filed: Dec. 18, 2006

(86) PCT No.: PCT/IB2006/054926

§ 371 (c)(1),
(2), (4) Date: Sep. 8, 2008

(87) PCT Pub. No.: WO2007/072404

PCT Pub. Date: Jun. 28, 2007

(65) Prior Publication Data

US 2009/0009925 A1    Jan. 8, 2009

(30) Foreign Application Priority Data

Dec. 22, 2005  (EP)  ................................. 05112842

(51) Int. Cl.
*H01L 29/96* (2006.01)
(52) U.S. Cl. ............... 257/415; 257/600; 257/E29.167; 438/50; 438/379
(58) Field of Classification Search ................. 257/108, 257/600, E29.167; 438/379
See application file for complete search history.

(56) References Cited

U.S. PATENT DOCUMENTS

| 6,040,611 | A | 3/2000 | De Los Santos et al. |
| 6,703,674 | B1 | 3/2004 | Marnfeldt |
| 6,897,537 | B2 * | 5/2005 | de los Santos ............... 257/414 |
| 2003/0178635 | A1 | 9/2003 | Volant et al. |
| 2006/0012343 | A1 | 1/2006 | Gallant |

FOREIGN PATENT DOCUMENTS

| EP | 0 986 082 B1 | 3/2000 |
| WO | WO 00/75762 A1 | 12/2000 |
| WO | WO 2004/000717 A2 | 12/2003 |

* cited by examiner

*Primary Examiner*—Stephen W Smoot
(74) *Attorney, Agent, or Firm*—Slater & Matsil, L.L.P.

(57) ABSTRACT

An RF MEMS tuneable arrangement, e.g. variable capacitor, having two or more tunable devices, e.g. variable capacitances, a coupling circuit arranged to couple the tunable devices together to provide a combined output, e.g. a combined capacitance, that is variable according to a tuning signal. The coupling circuit is reconfigurable to alter a response of the arrangement to changes in the tuning signal, to enable a broader range of applications, manufacturing cost reductions and more flexibility in design. The device can have a pivoted beam (30), actuable by a control signal, the beam having electrodes (40, 60) at either side of the pivot, and corresponding fixed electrodes (50, 70) facing the electrodes on the beam to provide a two or more variable devices such as switches or variable capacitors, arranged such that a given movement of the beam causes electrode separation in the same direction for the two or more switches or capacitors.

13 Claims, 4 Drawing Sheets

TUNEABLE ELECTRONIC DEVICES AND ELECTRONIC ARRANGEMENTS COMPRISING SUCH TUNEABLE DEVICES

This invention relates to tuneable electronic arrangements comprising tuneable devices such as impedances, e.g. capacitors, resistors, inductors, or sensors, to MEMS devices, to integrated circuits and to apparatus incorporating such MEMS devices, and to corresponding methods.

The term 'MEMS' (Micro-electromechanical system or structure or switch) can encompass various devices. A common arrangement of a MEMS device comprises a freestanding beam with a first electrode located opposite a second electrode. The first and the second electrode are mutually separated by an air gap. The first electrode can be moved towards or away from the second electrode by application of an actuation voltage to provide an electrostatic force (in principle other forces could be used such as an inductive force, or a thermal expansion force or a piezo electric force). Hence the term MEMS is intended to encompass piezomicroelectromechanical (PMEM).

Some common applications are:
- use as a microphone or a loudspeaker; (using a specific type of membrane)
- use as a sensor, particularly an air pressure sensor
- use as a resonator
- use as pixel switches in a display, or driving a mirror for an optical switch,
- use in RF applications, particularly as a switch or as a variable capacitance. One of the commercially important applications is the use for variable impedance matching with integrated band switching in the front end of a mobile wireless device such as a phone or computer.

Electrically tuneable components and circuits are in demand for such applications. By providing an appropriate control signal (e.g. the amplitude of a direct current) the characteristic of a component (e.g. the capacitance of a capacitor) may be varied such, that for any frequency another value of capacitance is provided in response to the control signal. Typical components having such characteristics are e.g. varactor diodes, pin diodes (switchable), fieldplates, photo resistors, and so on. In particular, pin- and varactor diodes are used in modern radio-frequency modules. However, typically, said components have certain disadvantages, like relatively high loss, and they require high amplitudes of the control signal.

It has been found that MEMS switches and switches may also be used for tuning as well as switching. The movable part of a correspondingly designed MEMS device can be moved continuously variable distances so that separation of plates or electrodes of a capacitor is varied which in turn has an impact on its capacitance. Compared to other semiconductor components (such as e.g. the varactor diode) MEMS have the advantage, that its loss is significantly lower which is of interest for application in radio frequency circuits and others.

However, MEMS have certain disadvantages. The tuning range is relative small. Moreover, linear slopes in characteristics of capacitance are also difficult to generate with traditional designs of MEMS.

An example of a variable capacitor using a MEMS device is shown in WO 2004/000717. Here it is explained that the capacitance increases as the gap between the electrodes is reduced. The motion is restricted by a mechanical spring force, which is directly proportional to the distance traveled by the moveable electrode. However the electrostatic attractive force has a non linear relationship with changes in the gap as the moveable electrode moves. Thus there is a point when the attractive force overcomes the spring force and the electrodes collapse together. The control voltage at which this occurs is called the "Pull in" voltage $V_{PI}$. This document also explains that this limits the capacitance tuning ratio to 1.5 to 1, which is inadequate for many applications. To increase this ratio, it is known to provide separate electrodes for the capacitor and for the electrostatic force, with a smaller gap for the capacitor electrodes. If the gap between the electrodes is reduced to a third of its initial size, then pull in can occur and the electrodes close together. The actuation voltage needs to be dropped further to enable release.

One of the main failure mechanisms of MEMS switches is stiction, in which the beam or membrane doesn't release from the counterelectrode when the actuation voltage is removed. Such sticking mainly occurs if there is moisture or foreign matter between the moveable actuating stage and the substrate. Sticking may occur in use or during a manufacturing process. It is known to address stiction using coatings or surface roughness such as dimpling, on the contact surfaces. A stopper can be used to cause a sudden steep increase in the repulsive force of the flexure elements as the gap closes, to give a non-linear restoring force which is capable of effectively preventing a moveable element from sticking.

For small MEMS capacitors in particular, a small area is required, therefore the actuation force will be smaller and very compliant springs with a very low value of stiffness k are required. Because these springs need to be very long to achieve the low k they occupy more area, which is not cost efficient. Long springs add much series resistance and series inductance to the capacitor, which is undesirable, especially when the springs carry an RF signal. Moreover a device with springs with a small spring constant is much more sensitive to failure due to stiction of the device in the closed state Failure occurs when the force are larger than the spring forces:

$$F_{stiction} > F_{spring} = kg$$

Physical origins for stiction forces are charges trapped in the dielectric, van der Waal forces between the surfaces or capillary forces in the presence of moisture between the electrodes.

It is known from U.S. Pat. No. 6,040,611 to provide a MEMS device with electrodes on a pivoted beam, either side of the anchor. Since the position of the beam is controlled by applying actuation voltages on either side of the anchor, the switching frequency is controlled by those voltages. Hence, the switching frequency, being independent from the stiffness of the cantilever beam, can be increased significantly.

An object of the invention is to provide improved tuneable devices such as capacitors, resistors, inductors and sensors and to provide MEMS devices, integrated circuits and apparatus incorporating such MEMS devices, and to provide corresponding methods.

According to a first aspect, the invention provides: a tuneable electronic arrangement having two or more tuneable devices, each of the tuneable devices having a movable element moveable with respect to a reference element the two or more tuneable devices being mechanically operatively linked by a micro-electromechanical structure, a response of each tuneable device being dependent upon the position of the moveable element with respect to the reference element, the micro-electromechanical structure being adapted for moving the movable element of a tuneable device to thereby vary the response of that tuneable device according to a tuning signal, a coupling circuit being arranged to couple the tuneable devices together to provide a combined response of the tuneable devices, and the coupling circuit being reconfigurable to alter the combined response of the tuneable arrangement to changes in the tuning signal.

The tuneable device can be a variable impedance such as a capacitor, resistance, inductance, etc. or may be a sensor. The reconfigurable circuit helps to overcome a least one of the drawbacks of conventional tuneable MEMS devices, e.g. it can help to reduce spring length and hence series resistance and series inductance, stiction and to enable a broader range of applications, manufacturing cost reductions and more flexibility in design.

An additional feature of some embodiments is the coupling circuit being arranged to switch between any of: a series coupling of the tuneable devices, e.g. variable impedances, a parallel coupling of the tuneable devices, e.g. variable impedances, a combination of series and parallel coupling, and a coupling of the tuneable devices, e.g. variable impedances having responses with opposing signs. These are some convenient ways of enabling the slope of the response to be adapted.

Another such additional feature is the two tuneable devices, e.g. variable impedances being dissimilar in any one or more of: a separation distance such as a separation between the moveable and reference elements, a size such as a size of the moveable and reference elements, a relationship of a separation distance between the moveable and reference elements to a tuning signal, and material parameters used in the manufacture of the arrangement. This helps enables a greater control of the characteristic of the combined response characteristic, e.g. the combined impedance.

An additional feature of some embodiments is the tuneable arrangement, e.g. a variable impedance such as a capacitor, being adapted for use with an RF signal and having a connection suitable for coupling the RF signal across the series coupled tuneable devices, e.g. variable impedances such as capacitors. This is a particularly valuable field of application.

An additional feature of some embodiments is at least some of the tuneable devices, e.g. variable impedances such as capacitors having the tuning signal coupled to one or both moveable and reference elements of the given tuneable device, e.g. variable impedance such as a capacitor, to use the moveable and reference elements as actuation electrodes. This can be in addition to use of the moveable and reference elements as response electrodes, e.g. electrodes of an impedance such as capacitor electrodes. This enables better use of limited space.

An additional feature of some embodiments is a shared micro electromechanical structure provided for two or more of the movable elements. This enables the structure to be made smaller, since there need be fewer supports, a spring constant can be reduced since there is twice the actuation force, so each support can be smaller, and series electrical resistances of the supports will therefore be smaller.

An additional feature of some embodiments is the shared structure comprising a pivoted beam and movable elements at either side of the pivot. This means the length can be shorter than cantilever arrangements relying only on bending of a beam. This can save space and reduce other problems such as slow switching speed.

Another such additional feature is corresponding reference elements, e.g. fixed electrodes, located so that both tuneable devices, e.g. impedances such as capacitors, respond with the same sign to a given movement of the beam. This enables a steeper slope in the response of the combined output of the tuneable arrangement, e.g. the combined impedance such as combined capacitance.

Another aspect provides an RF integrated circuit having one or more of the tuneable arrangements of the above type.

Another aspect provides a method of manufacturing such an integrated circuit.

Another aspect provides a method of tuning using such an integrated circuit.

Another aspect provides a micro electromechanical structure having a pivoted beam, actuable by a control signal, the beam having electrodes at either side of the pivot, and corresponding fixed electrodes facing the electrodes on the beam to provide a two or more variable devices such as switches or variable impedances, e.g. capacitors, resistors, inductors, or sensors, arranged such that a given movement of the beam causes electrode separation in the same direction.

The variation of separation being in the same direction rather than opposite directions helps enable a steeper response for a tuneable device, e.g. a variable impedance such as a capacitor, or a double pole switching action for a switch. Sharing one beam for two or more devices enables the structure to be made smaller, since there need be fewer supports, a spring constant can be reduced since there is twice the actuation force, so each support can be smaller, and series electrical resistances of the supports will therefore be smaller. The pivoted beam means the length can be shorter than cantilever arrangements relying only on bending of a beam. This can save space and reduce other problems such as slow switching speed.

Any of the additional features can be combined with each other and with any aspect of the invention. Other advantages will be apparent to those skilled in the art, especially compared to other prior art. Numerous variations and modifications can be made without departing from the scope of the claims of the present invention. Therefore, it should be clearly understood that the form of the present invention is illustrative only and is not intended to limit the scope of the present invention. How the present invention may be put into effect will now be described by way of example with reference to the appended schematic drawings.

The features of the invention will be better understood by reference to the accompanying drawings, which illustrate preferred embodiments of the invention. In the drawings.

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

At least some of the embodiments are based on a recognition that for some applications it would be useful if, in a tuneable arrangement such as a variable impedance, e.g. a tuneable capacitor arrangement, the output response characteristic of the arrangement, e.g. its capacitance, could be steeper or less steep as a function of a control signal and could also preferably be adjustable. Thus, these embodiments show a new configuration of tuneable components based on MEMS-technology, which is capable of addressing or compensating the outlined disadvantages. The new arrangement enables the tuning characteristic to be adapted in its tuning range and its slope as required to suit the conditions. Moreover, the length of the moveable part of the MEMS may be significantly reduced with the consequence that smaller voltages can be used to achieve a given deflection.

The present invention will mainly be described with reference to a variable capacitor arrangement however the present invention is not limited thereto. For example the present invention may be applied to other tuneable devices such as variable impedances in general or to sensors.

Figure 1:
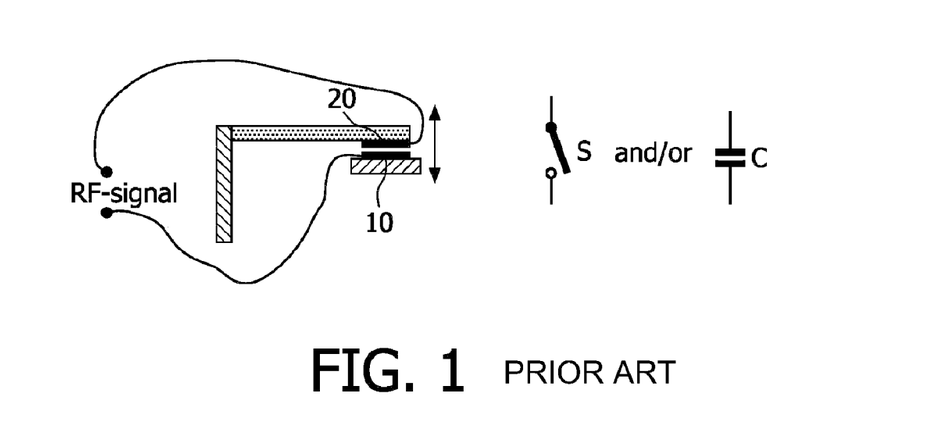
FIG. 1 shows a known arrangement.

By way of introduction, a known MEMS structure is shown schematically in FIG. 1. The connections of the control signal have been omitted in order to demonstrate the principles more clearly. In response to an appropriate control signal (e.g. a direct current having a predefined amplitude) the movable part of the MEMS is brought into a predefined position by causing a deflection of the arm. In doing so, an electrically conductive connection is established via the movable part itself as well as via a further electronic contact.

For generating tuneable components the characteristics of the movement and thus the change in capacitance, are modified by continuously varying the separation between an electrode 20 on the movable part (arm) and a fixed electrode 10. That results in a variation of the capacitance between said two conductive contacts as a function of the separation. Expressed very simply, the capacitance of a configuration according to FIG. 1 may be calculated according to the simple formula for a plate capacitor:

$$C = \frac{\varepsilon_0 \varepsilon_r A}{d}$$

with:

$\varepsilon_0$ representing the dielectric constant of vacuum $\varepsilon_0 = 8.85 \cdot 10^{-15}$ As/Vm, $\varepsilon_r$ representing the relative dielectric constant of the medium between said two switching contacts, A representing the surface area of said switching contacts, and d representing the distance between said two switching contacts.

Figure 11:
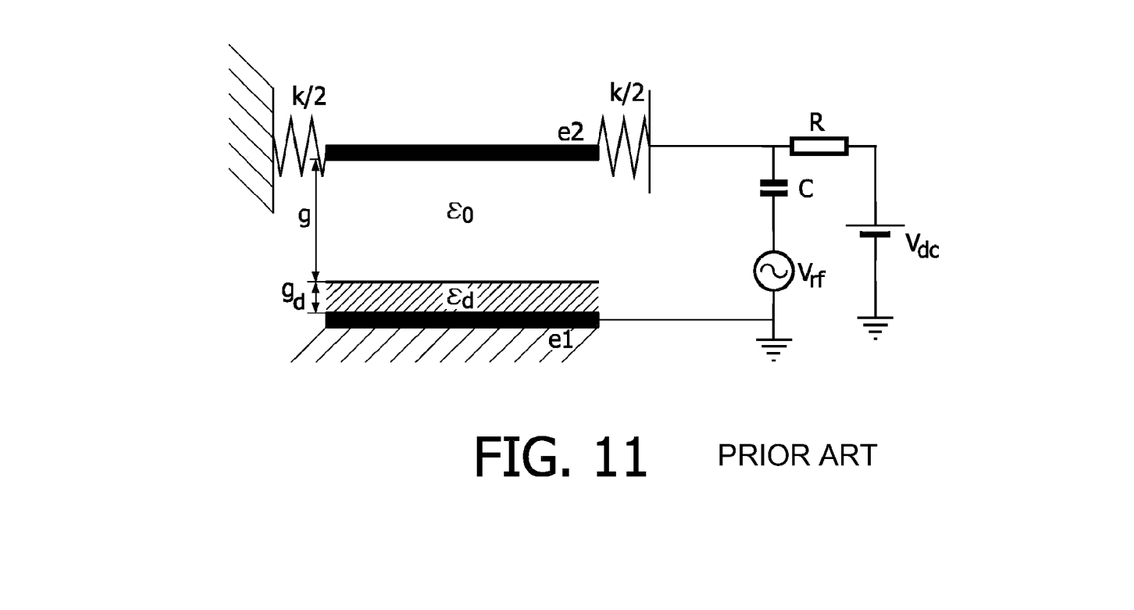
FIG. 11 shows a known MEMS structure.

FIG. 11 shows a schematic of mechanical and electrical connections in a conventional capacitive RF MEMS capacitor. Electrode e1 is fixed on the substrate and electrode e2 is movable with, respect to the substrate and suspended by springs with a total spring constant k. The springs are conducting and provide an electrical connection to an RF source representing the circuit to which the device is applied and a DC source for actuating the MEMS device. On top of the fixed electrode e1 a dielectric layer of thickness $g_d$, is situated with a dielectric constant $e_d$ When the spring is relaxed, there is an air gap with a distance g between the top of the dielectric layer and the bottom of the top electrode e2.

Two common constructions which may be used as a basis for the present invention and have novel features of the present invention included therein are as follows:

1. A MEMS structure in a substrate of a semiconductor material such as silicon. In this case the electrodes are oriented perpendicular to the substrate surface. This construction is typically used for sensor and for resonator applications (other applications are not excluded).
2. A MEMS structure as a thin-film element. The beam is here oriented substantially parallel to the substrate. This type of MEMS structure is typically used for RF MEMS. There are at least two constructions for the beam:
   a double clamped beam (a beam that is connected to the substrate surface at two or more sides, so the deflection to the substrate occurs in the centre of the beam)
   a single clamped beam (in which case the deflection to the substrate occurs at the end of the beam).

The beam is generally provided with holes, provided for the etching of the sacrificial layer between the beam and the substrate to create the air gap. These holes also help to reduce air damping by allowing air to flow in and out of the cavity between beam and substrate, while opening or closing the beam. However there are manufacturing techniques in which the beam is assembled to the substrate, so no holes are needed for the etching. It is also possible to use a beam that is an intermediate layer between a top electrode and a bottom electrode.

Figure 2:
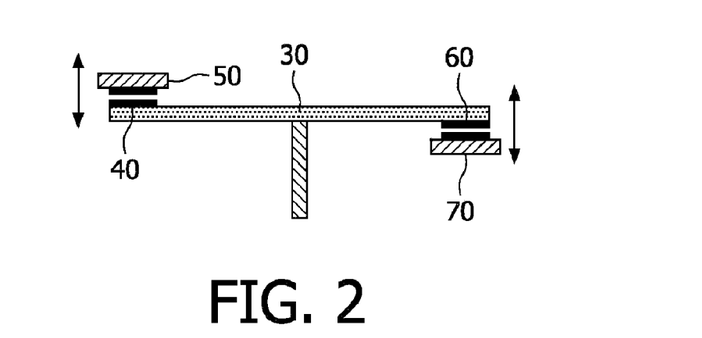
FIGS. 2 to 4 show embodiments of the invention.

A first embodiment of the present invention is a tuneable electronic arrangement having a MEMS structure comprising at least one more movable arm is shown in FIG. 2. The additional arm (shown on the left hand side in the figure) is preferably mechanically and operatively linked to the first arm. For example, the additional arm may be fixed to the first arm (on the right hand side), to achieve a pivoted beam 30. This means that movement of the second (left) arm will occur as soon as the original (right) arm is moved (by an appropriate control signal). Hence the two arms are mechanically and operatively linked by a MEMS structure. Moreover, an alternative construction is conceivable which has two separate and independently controllable moveable arms, rather than a pivot. The example shown in FIG. 11 described above can be applied as an alternative to the pivoted beam.

The two arms form a beam supported by a pivot (and are controlled in such a way), that the moving direction of those arms is complementary. In other words if the right arm is turned down the left arm is turned up (and vice versa). The arms have electrodes 40, 60 arranged to face fixed electrodes 50, 70 to form variable devices such as a switch or a tunable device, e.g. a variable impedance such as a capacitor. The variable devices, e.g. capacitors at either side of the pivot are arranged so that for a given movement of the beam, both capacitances change in the same direction, so their capacitance characteristics have slopes of the same sign.

Figure 3:
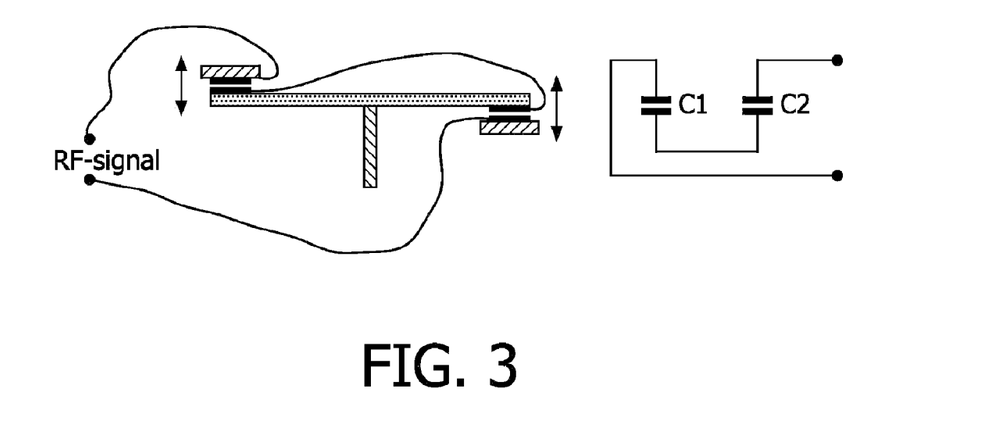
Figure 4:
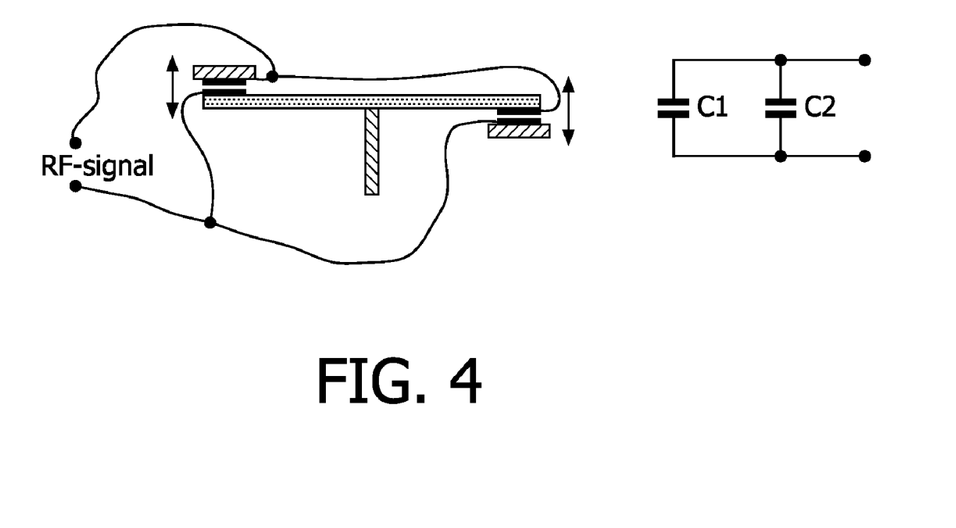

If e.g. the distance $d_1$ is reduced the distance $d_2$ is reduced too; if the distance $d_1$ is enlarged $d_2$ is enlarged too. This arrangement can now be used for modifying a combined capacitance characteristic of the two capacitors of the tuning component in an appropriate manner. In addition to the being mechanically and operatively linked the variable devices are also linked electrically to provide a combined output response. The two output characteristics can be combined in different ways, e.g. selected by electrical switches. Two different types of connection combinations, e.g. switching combinations, are shown in FIGS. 3 and 4. FIG. 3 shows a series connection, and FIG. 4 shows a parallel connection of the two capacitors.

These two types of connection combinations result in two different values or characteristics for the overall output response, e.g. capacitance, of such a component. Under the simplified assumption of an ideal symmetrical design the following applies: $d=d_1=d_2$, $A=A_1=A_2$ as well as $\epsilon_r=\epsilon\epsilon_{r1}=\epsilon_{r2}$ (moreover: $\epsilon=\epsilon_0\epsilon_{r,x}$).

In that case the total capacitance of the capacitor circuits can be calculated as follows:

1. Series connection $$C_S = \frac{1}{2}\frac{\varepsilon A}{d}$$

2. Parallel connection $$C_P = 2\frac{\varepsilon A}{d}$$

In comparison thereto the simplified formula for the simple capacitor as in FIG. 1 is:

$$C = \frac{\varepsilon A}{d}$$

As can be seen from the formulas for calculating the total capacitance said formulas differ in certain coefficients $a_0$ ($a_0=\frac{1}{2}$ and/or $a_0=2$) in comparison to the calculation of a simple capacitor. This coefficient basically defines the slope of the variation of the capacitance as a function of the distance d of the plates.

Figure 5:
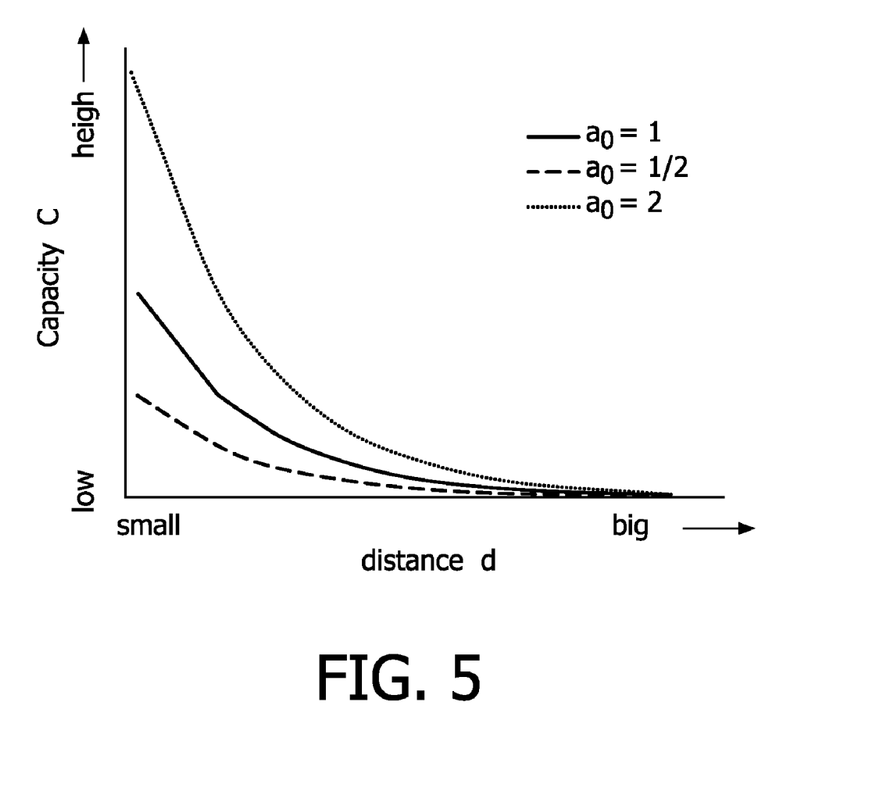
FIG. 5 shows a graph of combined capacitance showing characteristics having different slopes.

Regarding the separation of the electrodes as a variable parameter, a dependency of the capacitance of the simple capacitor results which is proportional to 1/d. However, the configuration according to the embodiments of FIG. 3 or 4 shows a dependency of the capacitance according ½ l/d in the case of a series connection and/or of 2 l/d in the case the parallel connection or of in general $a_0*l/d$. FIG. 5 shows a graph of the different variations in the capacitance as a function of the separation d of the electrodes and the parameters $a_0$.

Accordingly, due to the new configuration, the variation of the combined output response, e.g. capacitance, as a function of the separation d may be modified by switching the connections of the two variable devices, e.g. capacitors, to achieve a steeper ($a_0=2$) or a less steep ($a_0=\frac{1}{2}$) slope in the characteristic of the combined output response, e.g. capacitance.

Figure 6:
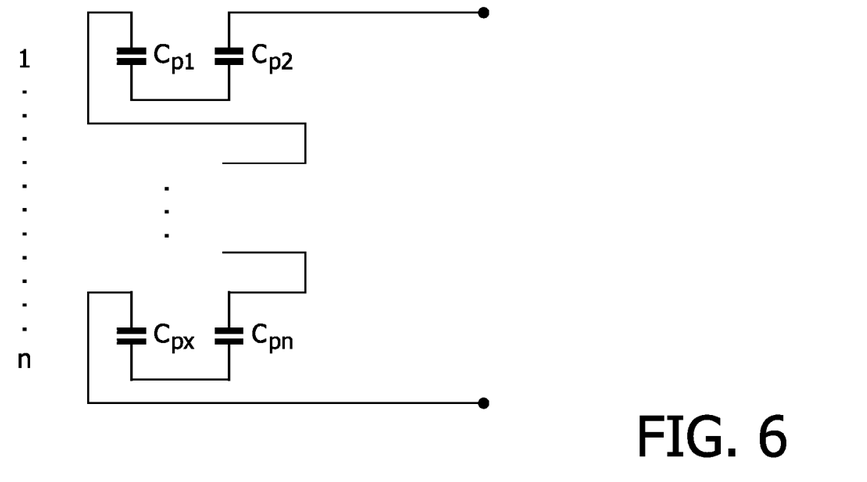
FIGS. 6 to 10 show embodiments of the invention.

Further embodiments are envisaged, using a variety of combinations of variable devices, e.g. capacitances, in tuneable electronic arrangement. The factor $a_0$ may—beside the two values ½ and/or 2 given by example—take any arbitrary other value. For that purpose the following possibilities which may be applied in combination lend themselves:

1. Different plate separations $d_x$
2. Different plate sizes $A_x$
3. Different lengths of the movable arms (leverage arms) $l_x$ to alter the relationship of separation and tuning signal
4. Different material parameter $\epsilon_{r,x}$ Further embodiments are envisaged by combining (connecting together) more than two of the variable devices, e.g. capacitances (for example on a semiconductor substrate or PCB plane) so that the factor $a_0$ may be further varied:

In case of a n-fold series connection as shown in FIG. 6:
$a_0=1/n*½$

Figure 7:
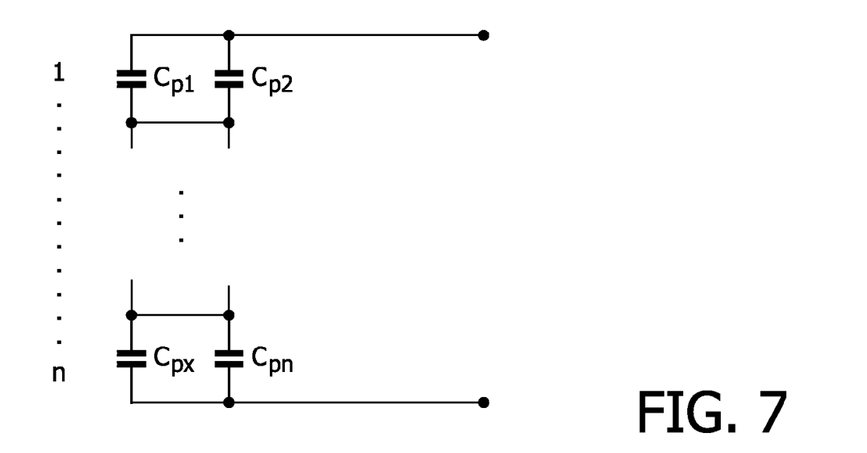

In case of a n-fold parallel connection as shown in FIG. 7:
$a_0=n*2$ (n representing an integer and positive).

Figure 8:
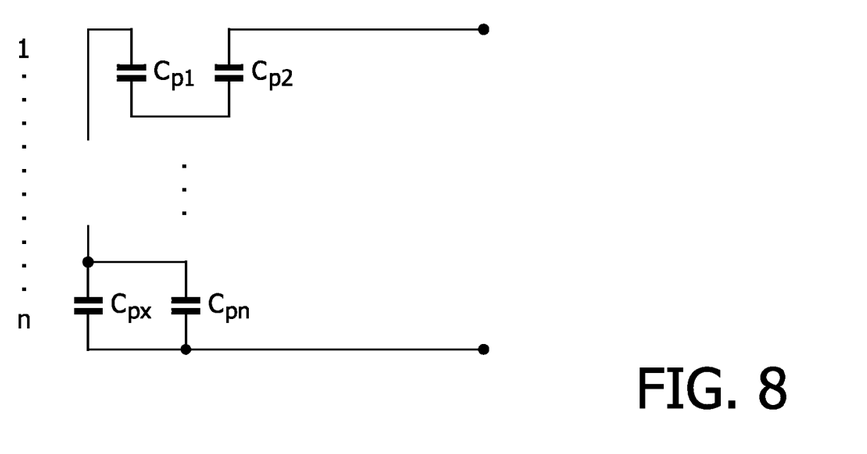

Also a series connection may be combined with a parallel connection (as shown in FIG. 8) which leads in the case of a completely symmetrical design to an identical change of the output response, e.g. capacitance (½*2=1) as in the case of the simpler embodiment, but may help achieve other advantages such as a shift of a resonance frequency. In the case of an unsymmetrical design in principle any arbitrary value of $a_0$ may be realized.

A further combination in principle with the parallel- or the series connection (or with the mixed combination) is to add a variable device or devices, e.g. capacitor or capacitors, with an oppositely sloping characteristic for the output characteristic. This can be achieved by placing electrodes on both sides of the beam so that as the separation $d_1$ increases (reduction of the capacitor C1) the distance $d_2$ decreases (enlargement of the capacitor C2) and vice versa.

By such combinations the variation of the combined output response, e.g. capacitance, as a function of the separations of the electrodes may be further modified. In particular, some combinations enable tuning components allowing very small variations of the combined output response, e.g. capacitance, for finer tuning.

Figure 9:
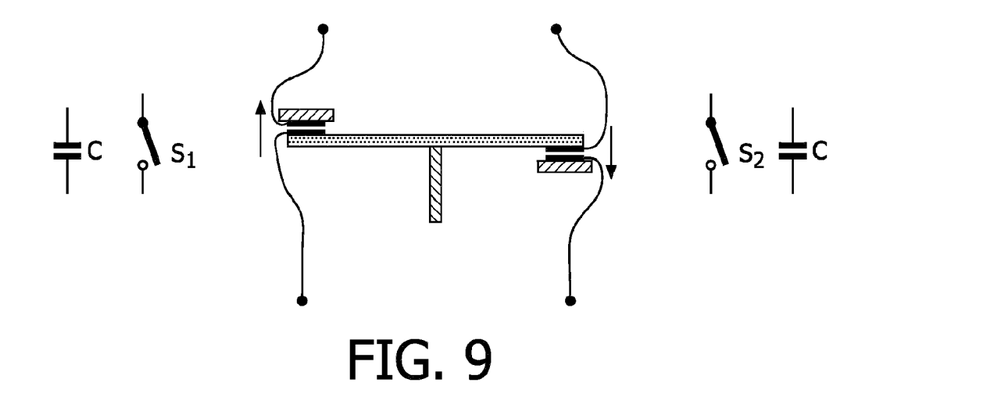

A further embodiment of a tuneable electronic arrangement is shown in FIG. 9. In this case, the electrodes can be used as a switch or a capacitor as shown. If the variations of the capacitance as a function of the separation of the electrodes are ignored and if only the two final states of the fix contact between the contact plates (MEMS switch) are considered, the construction may also be operated as a dual pole switch (FIG. 9). Alternatively, if the corresponding switching contacts of the dual switch are bypassed and are thus simultaneously used the maximal current load capacitance may be doubled. This arrangement is useful for high power applications, if high currents flow through the switch (e.g. power amplifier). In this way a dual capacitor and/or a dual tuning function may also be realized.

Figure 10:
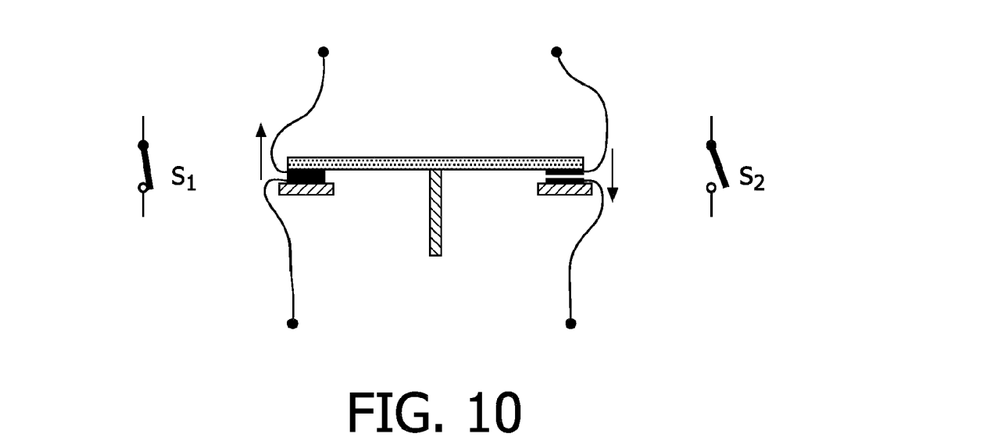

Under the assumption that the connecting areas of the switch are arranged as shown in FIG. 10 an application as a toggle switch may also be realized. Multiple combinations analogous to the circuits of variable devices, such as capacitors, inductors, or resistors, or sensors or to the combinations of switches known from the general circuit technology may be realized too. FIG. 10 provides two switches S1 and S2 whose one poles are attached to the beam. Operation of the beam creates a 'double switching' functionality.

Conventional processes can be used to form the micromechanical structures. More details of a possible implementation of a pivot are described in U.S. Pat. No. 6,040,611. Although described with regard to elements movable perpendicular to a substrate, in principle the movement can be parallel or have a component parallel.

Devices of the present invention can be useful for applications such as antenna matching, band switching and other uses in adaptive antennas for mobile phones, particularly where it is important to be able to handle high RF voltages without pull-in. Other applications include any RF signal electronics or high-power RF systems, or other mobile phone circuitry or wireless mobile computing devices for example. MEMS capacitor devices may be produced which may be used for development of different programmable devices, both linear and non-linear, high-frequency circuits (LNA, mixers, VCO, PA, filters, etc.), e.g. in re-configurable radio systems.

It is to be understood that although preferred embodiments, specific constructions and configurations, as well as materials, have been discussed herein for devices according to the present invention, various changes or modifications in form and detail may be made without departing from the scope and spirit of this invention. For example, the present invention includes a tuneable inductor, e.g. made using e.g. a ferrite material that is placed onto one side of a MEMS beam, and a spiral- or meander-like shaped conductive inductor structure is applied, e.g. printed onto an underlying substrate opposing the beam. The control circuit can be adapted to vary the distance between the ferrite and the conductive structures to provide a variable inductor, variable as a function of the distance separating the ferrite and the conductive element. For example, the present invention includes a tuneable resistor, e.g. made using e.g. a magnetic material that is placed onto one side of a MEMS beam, and a magneto-resistive conductive structure is applied onto an underlying substrate opposing the beam. The control circuit can be adapted to vary the distance between the magnet and the conductive structures to provide a variable resistor, variable as a function of the distance separating the magnet and the conductive element. The present invention also includes placing a sensor, e.g. a Hall sensor opposite a magnetic material on a moveable MEMS structure. Moving the magnetic material towards and away from the Hall sensors will alter their combined output as explained above.

The invention claimed is:

1. A tuneable electronic arrangement having two or more tuneable devices, each of the tuneable devices having a movable element moveable with respect to a reference element, the two or more tuneable devices being mechanically operatively linked by a micro-electromechanical structure, a response of each tuneable device being dependent upon the position of the moveable element with respect to the reference element, the micro-electromechanical structure being adapted for moving the movable element of a tuneable device to thereby vary the response of that tuneable device according to a tuning signal, a coupling circuit being arranged to couple the tuneable devices together to provide a combined response of the tuneable devices, and the coupling circuit being reconfigurable to alter the combined response of the tuneable electronic arrangement to changes in the tuning signal.

2. The tuneable electronic arrangement of claim 1, wherein at least some of the tuneable devices have the tuning signal coupled to one or both of the moveable and reference elements of the given tuneable device, to thereby use the elements as actuation elements as well as providing a response.

3. A tuneable electronic arrangement having two or more tuneable devices, each of the tuneable devices having a movable element moveable with respect to a reference element, the two or more tuneable devices being mechanically operatively linked by a micro-electromechanical structure, a response of each tuneable device being dependent upon the position of the moveable element with respect to the reference element, the micro-electromechanical structure being adapted for moving the movable element of a tuneable device to thereby vary the response of that tuneable device according to a tuning signal, a coupling circuit being arranged to couple the tuneable devices together to provide a combined response of the tuneable devices, and the coupling circuit being reconfigurable to alter the combined response of the tuneable electronic arrangement to changes in the tuning signal, wherein the coupling circuit is arranged to switch between any of a series coupling of the tuneable devices, a parallel coupling of the tuneable devices, a combination of series and parallel coupling, and a coupling of the tuneable devices having responses with opposing signs.

4. The tuneable electronic arrangement of claim 3, wherein the two or more tuneable devices are dissimilar in any one or more of a separation of the moveable and reference element, a size of the reference or moveable element, a relationship of a separation of the moveable and reference element in dependence on a tuning signal, and material parameters.

5. The tuneable electronic arrangement of claim 3, wherein the arrangement is adapted for use with an RF signal, the arrangement having a connection suitable for coupling the RF signal across series coupled tuneable devices.

6. The tuneable electronic arrangement of claim 3, wherein the arrangement has a shared micro-electromechanical structure provided for two or more of the movable elements.

7. The tuneable electronic arrangement of claim 6, wherein the shared micro-electromechanical structure comprises a pivoted beam, the movable elements being arranged at either side of a pivot of the pivoted beam.

8. The tuneable electronic arrangement of claim 7, comprising corresponding reference elements located so that the tuneable devices respond with the same sign to a given movement of the pivoted beam.

9. The tuneable electronic arrangement of claim 3, wherein the tuneable devices comprise variable impedances or sensors.

10. The tuneable electronic arrangement of claim 3, wherein the tuneable devices comprise variable resistors, capacitors or inductors.

11. An RF integrated circuit having one or more of the tuneable electronic arrangements having two or more tuneable devices, each of the tuneable devices having a movable element moveable with respect to a reference element, the two or more tuneable devices being mechanically operatively linked by a micro-electromechanical structure, a response of each tuneable device being dependent upon the position of the moveable element with respect to the reference element, the micro-electromechanical structure being adapted for moving the movable element of a tuneable device to thereby vary the response of that tuneable device according to a tuning signal, a coupling circuit being arranged to couple the tuneable devices together to provide a combined response of the tuneable devices, and the coupling circuit being reconfigurable to alter the combined response of the tuneable electronic arrangement to changes in the tuning signal.

12. A method of manufacturing the RF integrated circuit, the method comprising:

forming two or more tuneable devices, each of the tuneable devices having a movable element moveable with respect to a reference element, the two or more tuneable devices being mechanically operatively linked by a micro-electromechanical structure, a response of each tuneable device being dependent upon the position of the moveable element with respect to the reference element, the micro-electromechanical structure being adapted for moving the movable element of a tuneable device to thereby vary the response of that tuneable device according to a tuning signal; and forming a coupling circuit arranged to couple the tuneable devices together to provide a combined response of the tuneable devices, the coupling circuit being reconfigurable to alter the combined response of the tuneable electronic arrangement to changes in the tuning signal and reconfigurable to alter a response of the combined response to changes in the tuning signal.

13. A method of reconfiguring a tuneable electronic arrangement having two or more tuneable devices, and a coupling circuit arranged to couple the tuneable devices together to provide a combined response of the tuneable devices, each of the tuneable devices having a movable element and a reference element and the two or more tuneable devices being operatively linked by a micro-electromechanical structure for moving the movable element with respect to the reference element to thereby vary the response of that tuneable device according to a tuning signal, the method having the step of reconfiguring the coupling circuit to alter a combined response of the tuneable electronic arrangement to changes in the tuning signal.

* * * * *